United States Patent
Mukai

(10) Patent No.: US 7,270,898 B2
(45) Date of Patent: *Sep. 18, 2007

(54) POLYCRYSTALLINE STRUCTURE OF ORDERED ALLOY AND METHOD OF MAKING THE SAME

(75) Inventor: Ryoichi Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/955,545

(22) Filed: Sep. 30, 2004

(65) Prior Publication Data

US 2005/0042425 A1 Feb. 24, 2005

Related U.S. Application Data

(63) Continuation of application No. PCT/JP02/03381, filed on Apr. 4, 2002.

(51) Int. Cl.
*G11B 5/66* (2006.01)
*G11B 5/70* (2006.01)

(52) U.S. Cl. ............ 428/836.1; 428/402; 428/827

(58) Field of Classification Search ........ 428/402, 428/836.1, 827, 828, 828.1
See application file for complete search history.

(56) References Cited

U.S. PATENT DOCUMENTS

| | | | |
|---|---|---|---|
| 5,759,681 A | 6/1998 | Hosoe et al. | |
| 5,843,569 A | 12/1998 | Kaitsu et al. | 428/323 |
| 6,068,739 A | 5/2000 | Suzuki et al. | |
| 6,623,857 B2 | 9/2003 | Watanabe et al. | 428/402 |
| 6,641,934 B1 | 11/2003 | Suzuki et al. | |
| 2001/0009119 A1* | 7/2001 | Murray et al. | 75/348 |
| 2002/0132083 A1* | 9/2002 | Weller et al. | 428/65.3 |
| 2003/0157325 A1* | 8/2003 | Anders et al. | 428/402 |

FOREIGN PATENT DOCUMENTS

| | | |
|---|---|---|
| CN | 1136693 | 11/1996 |
| JP | 8-77540 | 3/1996 |
| JP | 9-134518 | 5/1997 |
| JP | 10092637 | 4/1998 |
| JP | 10092640 | 4/1998 |
| JP | 10-149526 | 6/1998 |
| JP | 11-353648 | 12/1999 |
| JP | 2000123344 | 4/2000 |

(Continued)

OTHER PUBLICATIONS

Watanabe et al., "Microstructure and magnetic properties of FePt-Al-O granular thin films", Appl Phys Lett, vol. 76, No. 26, pp. 3971-3973, Jun. 2000.*

*Primary Examiner*—Holly Rickman
(74) *Attorney, Agent, or Firm*—Greer, Burns & Crain, Ltd.

(57) ABSTRACT

Magnetic crystalline grains are spaced from each other on a base layer a polycrystalline structure. The magnetic crystalline grains are made of an ordered alloy. The ordered alloy serves to ensure the crystalline magnetic anisotropy energy larger than that of Co alloy in the magnetic crystalline grains. Such crystalline magnetic anisotropy energy reaches over $1 \times 10^6 \text{J/m}^3$, for example. A sufficient magnetic crystalline magnetic anisotropy energy serves to reliably maintain the magnetization in finely structured magnetic crystalline grains. The ordered alloy may have the $L1_0$ structure, for example. The ordered alloy may include of $Fe_{50}Pt_{50}$ (atom %), $Fe_{50}Pd_{50}$ (atom %), $Co_{50}Pt_{50}$ (atom %), and the like.

14 Claims, 9 Drawing Sheets

FOREIGN PATENT DOCUMENTS

| | | |
|---|---|---|
| JP | 2001043523 | 2/2001 |
| JP | 2001076329 | 3/2001 |
| JP | 2001-101645 | 4/2001 |
| JP | 2001101641 | 4/2001 |
| JP | 2001176059 | 6/2001 |
| JP | 2001-256640 | 9/2001 |
| JP | 2001-273622 | 10/2001 |

* cited by examiner

POLYCRYSTALLINE STRUCTURE OF ORDERED ALLOY AND METHOD OF MAKING THE SAME

This is a continuation of International PCT Application No. PCT/JP02/03381 filed Apr. 4, 2002.

BACKGROUND OF THE INVENTION

1. Field of the Invention:

The present invention relates to a polycrystalline structure often utilized for a magnetic recording layer of a magnetic recording medium such as a hard disk, for example, and to a method of making the same.

2. Description of the Prior Art:

A continuous layer of a polycrystalline structure is often utilized for a magnetic recording layer in the technical field of magnetic recording media. The continuous layer of the polycrystalline structure includes minute Co alloy crystalline grains formed on the surface of the base layer based on the epitaxy. The continuous layer of the polycrystalline structure allows Cr atoms to diffuse along grain boundaries between the adjacent Co alloy crystalline grains. The Cr atoms forms non-magnetic walls between the adjacent Co alloy crystalline grains, so that magnetic interaction is reliably prevented between the adjacent Co alloy crystalline grains. Magnetic domains are established in the individual crystalline grains. As conventionally known, fine Co alloy crystalline grains serve to reliably reduce noise in a read signal for magnetic information.

For example, an ordered alloy such as $Fe_{50}Pt_{50}$ (atom %) exhibits a remarkably larger crystalline magnetic anisotropy energy as compared with Co alloy. The crystalline magnetic anisotropy energy of the ordered alloy often reaches over $1 \times 10^6 J/m^3$, for example. A larger crystalline magnetic anisotropy energy serves to maintain magnetization within a fine crystalline grain. On the other hand, a smaller crystalline magnetic anisotropy energy causes loss of magnetization within a fine crystalline grain due to thermal agitation. Utilization of an ordered alloy is desired in place of Co alloy so as to realize fine crystalline grains. However, a continuous layer of a polycrystalline structure made of an ordered alloy cannot enjoy the aforementioned diffusion of non-magnetic atoms along the grains boundaries. Magnetic interaction should reliably be cut off between the adjacent crystalline grains made of an ordered alloy.

SUMMARY OF THE INVENTION

It is accordingly an object of the present invention to provide a polycrystalline structure contributing to a reliable realization of fine magnetic crystalline grains, and a method of making the same.

According to the present invention, there is provided a polycrystalline structure comprising: abase layer; and magnetic crystalline grains spaced from each other on the base layer, said magnetic crystalline grains being made of an ordered alloy.

The magnetic crystalline grains are made of the ordered alloy in the polycrystalline structure. The ordered alloy serves to ensure the crystalline magnetic anisotropy energy larger than that of Co alloy in the magnetic crystalline grains. Such crystalline magnetic anisotropy energy reaches over $1 \times 10^6 J/m^3$, for example. A sufficient magnetic crystalline magnetic anisotropy energy serves to reliably maintain the magnetization in finely structured magnetic crystalline grains. The ordered alloy may have the $L1_0$ structure, for example. The ordered alloy may include of $Fe_{50}Pt_{50}$ (atom %), $Fe_{50}Pd_{50}$ (atom %), $Co_{50}Pt_{50}$ (atom %), and the like.

Moreover, the adjacent magnetic crystalline grains are spatially spaced form each other on -the base layer in the polycrystalline structure. Specifically, spaces are reliably established between the adjacent magnetic crystalline grains. The individual magnetic crystalline grains independently exist on the base layer, so that establishment of magnetic interaction can reliably be prevented between the adjacent magnetic crystalline grains. Magnetic domains can independently be established in the individual magnetic crystalline grains.

The polycrystalline structure of the type may be utilized in a magnetic recording medium such as a magnetic recording disk. The aforementioned base layer and magnetic crystalline grains may be formed on the surface of a support member such as a substrate in the magnetic recording medium, for example. The fine magnetic crystalline grains magnetically isolated from each other in the aforementioned manner serves to greatly reduce transition noise between the adjacent recording tracks on the surface of the magnetic recording medium. The fine magnetic crystalline grains greatly contribute to improvement in the density of the recording tracks and the recording capacity of the magnetic recording medium.

Here, the base layer may be made of non-magnetic crystals oriented in a predetermined direction. The base layer of the type serves to align the orientation of the magnetic crystalline grains in a predetermined direction. The base layer reliably controls the orientation of the magnetic crystalline grains.

The polycrystalline structure may further comprise: an isolating layer covering over the magnetic crystalline grains on the base layer; and upper magnetic crystalline grains spaced from each other on the surface of the isolating layer, said upper magnetic crystalline grains being made of an ordered alloy. The polycrystalline structure allows an increase in the total thickness of the upper and lower magnetic crystalline grains in the overall polycrystalline structure although the isolating layer is interposed between the upper and lower magnetic crystalline grains. This enables an increased intensity of the magnetic field leaking from the polycrystalline structure. The polycrystalline structure of the type reliably contributes to improvement in the density of the recording tracks and the recording capacity of the magnetic recording medium. The isolating layer may be made of non-magnetic crystals oriented in a predetermined direction in the same manner as the aforementioned base layer.

Furthermore, the polycrystalline structure may further comprise: a first isolating layer covering over the magnetic crystalline grains on the base layer; first upper magnetic crystalline grains spaced from each other on the surface of the first isolating layer, said first upper magnetic crystalline grains being made of an ordered alloy; a second isolating layer covering over the first upper magnetic crystalline grains on the first isolating layer; and second upper magnetic crystalline grains spaced from each other on the surface of the second isolating layer, said second upper magnetic crystalline grains being made of an ordered alloy. As described above, the polycrystalline structure allows an increase in the total thickness of the upper and lower magnetic crystalline grains in the overall polycrystalline structure. This reliably enables an increased intensity of the magnetic field leaking from the polycrystalline structure. Otherwise, the polycrystalline structure of the type may allow a repeated superposition of layered structure comprising the isolating layer and the magnetic crystalline grains three times or more. Here, the first and second isolating layers may be made of non-magnetic crystals oriented in a predetermined direction.

A specific method may be utilized to make the aforementioned polycrystalline structures. For example, the method may comprise: applying or depositing first and second metal atoms in a predetermined ratio on the surface of a base layer; and forming magnetic crystalline grains on the surface of the base layer based on heat treatment applied to the surface of the base layer.

The method enables aggregation of the first and second metal atoms on the surface of the base layer based on heat treatment. The magnetic crystalline grains, made of an ordered alloy including the first and second atoms, are formed on the surface of the base layer because of the aggregation. Since the migration of the first and second metal atoms is induced to form the magnetic crystalline grains, spaces are defined between the adjacent magnetic crystalline grains. When application or deposition of the first and second metal atoms and the heat treatment are repeated, the first and second metal atoms gather around the existing magnetic crystalline grains. The individual magnetic crystalline grains grow larger based on the repeated aggregation. The size or diameter of the magnetic crystalline grains can be controlled in this manner. A uniform disposition of the magnetic crystalline grains can also be kept. The deposition of the first and second metal atoms is preferably designed to reach the thickness of 1.0 nm or smaller, preferably of 0.5 nm or smaller.

A crystalline layer is employed as the base layer. The crystalline layer may include crystals oriented in a predetermined direction. The crystalline layer of the type serves to control the orientation of the ordered alloy during the aggregation. The direction of the axis of easy magnetization can thus be adjusted within the magnetic crystalline grains. The crystalline layer may be made of MgO, for example. When MgO is sputtered in a normal or room temperature, the crystals of the deposited MgO is oriented in the (100) plane. The crystals of this orientation serve to establish the magnetic crystalline grains oriented in the (001) plane.

The method may further comprise: forming an isolating layer covering over the magnetic crystalline grains already existing, prior to the application of the first and second metal atoms. The isolating layer serves to protect the first and second metal atoms from the influence from the existing magnetic crystalline grains in forming new magnetic crystalline grains. The aggregation of newly deposited first and second metal atoms can be realized without receiving the influence from the existing magnetic crystalline grains. Enlargement of the magnetic crystalline grains can accordingly be prevented. The magnetic crystalline grains are anew formed on the isolating layer. Spaces are reliably defined between the adjacent magnetic crystalline grains in the same manner as the existing magnetic crystalline grains. Moreover, the magnetic crystalline grains are equally arranged or dispersed on the surface of the isolating layer.

A crystalline layer is employed as the isolating layer. The crystalline layer may include crystals oriented in a predetermined direction. The crystalline layer of the type serves to control the orientation of the ordered alloy during the aggregation. The direction of the axis of easy magnetization can thus be adjusted within the magnetic crystalline grains. The crystalline layer may be made of MgO, for example. When MgO is sputtered in a normal or room temperature, the crystals of the deposited MgO is oriented in the (100) plane. The crystals of this orientation serve to establish the magnetic crystalline grains oriented in the (001) plane.

The first and second metal atoms may be deposited on the surface of the base layer in the ratio of 50 atom % to 50 atom. The first and second metal atoms may be selected from a group consisting of a combination of Fe and Pt, a combination of Fe and Pd, and a combination of Co and Pt.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
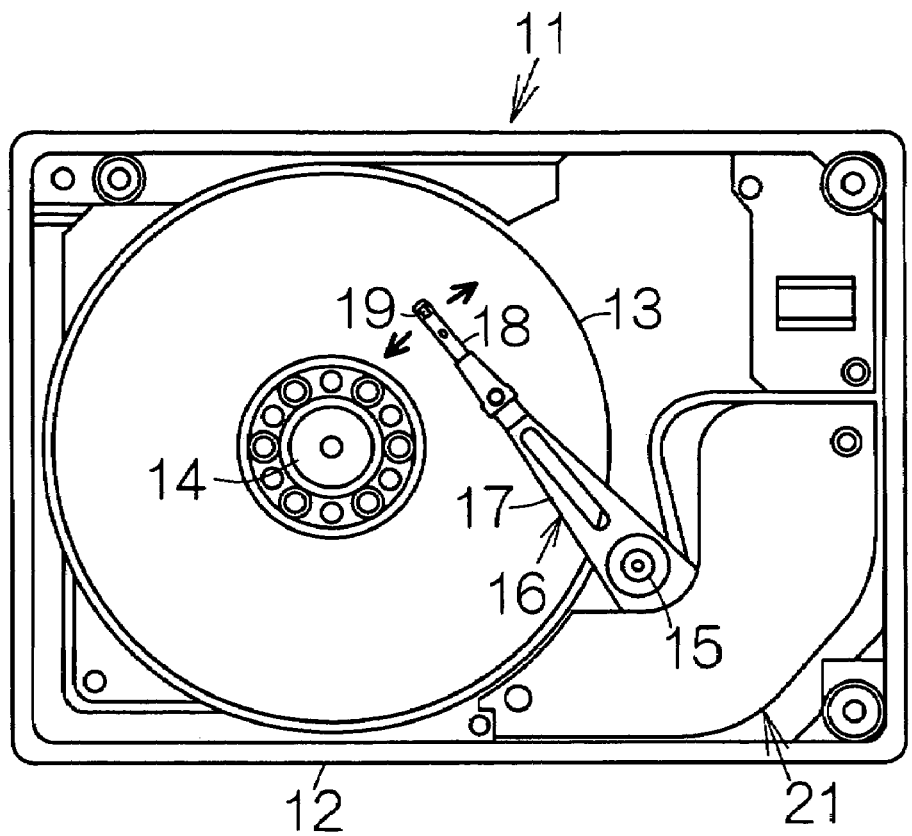
FIG. 1 is a plan view schematically illustrating the structure of a hard disk drive (HDD) as a specific example of a magnetic recording medium drive or storage device.

FIG. 1 schematically illustrates the interior structure of a hard disk drive (HDD) 11 as an example of a magnetic recording medium drive or storage device. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution rate such as 7,200 rpm, 10,000 rpm, or the like, for example. A cover, not shown, is coupled to the main enclosure 12 so as to define the closed inner space between the main enclosure 12 and itself.

A carriage 16 is also incorporated in the inner space of the main enclosure 12 for swinging movement about a vertical support shaft 15. The carriage 16 includes a rigid swinging arm 17 extending in the horizontal direction from the vertical support shaft 15, and an elastic head suspension 18 fixed to the tip end of the swinging arm 17 so as to extend forward from the swinging arm 17. As conventionally known, a flying head slider 19 is cantilevered at the tip end of the head suspension 18 through a gimbal spring, not shown. The head suspension 18 serves to urge the flying head slider 19 toward the surface of the magnetic recording disk 13. When the magnetic recording disk 13 rotates, the flying head slider 19 is allowed to receive airflow generated along the rotating magnetic recording disk 13. The airflow serves to generate a lift on the flying head slider 19. The flying head slider 19 is thus allowed to keep flying above the surface of the magnetic recording disk 13 during the rotation of the magnetic recording disk 13 at a higher stability established by the balance between the lift and the urging force of the head suspension 18.

When the carriage 16 is driven to swing about the support shaft 15 during the flight of the flying head slider 19, the flying head slider 19 is allowed to cross the recording tracks defined on the magnetic recording disk 13 in the radial direction of the magnetic recording disk 13. This radial movement serves to position the flying head slider 19 right above a target recording track on the magnetic recording disk 13. In this case, an actuator 21 such as a voice coil motor (VCM) can be employed to realize the swinging movement of the carriage 16, for example. As conventionally known, in the case where two or more magnetic recording disks 13 are incorporated within the inner space of the main enclosure 12, a pair of the swinging arm 17 and head slider 19 is disposed between the adjacent magnetic recording disks 13.

Figure 2:
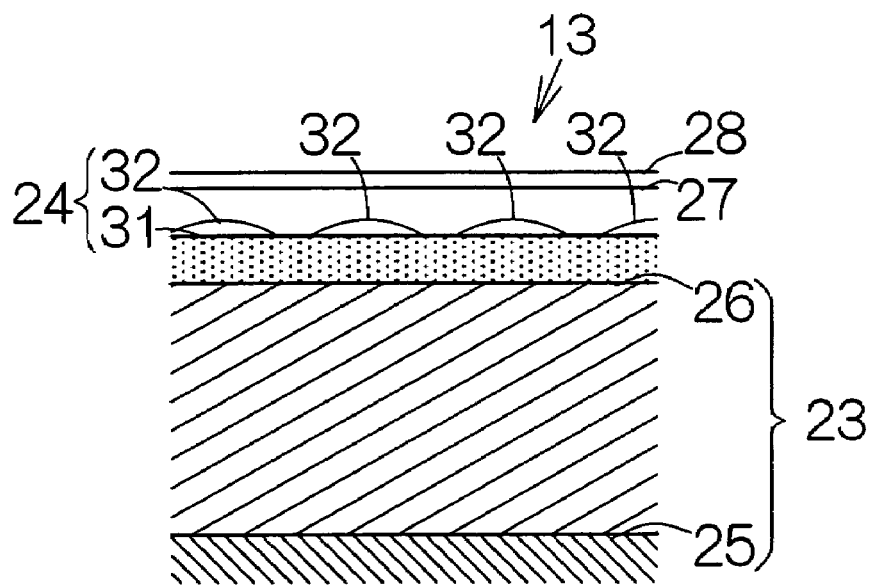
FIG. 2 is an enlarged partial sectional view for schematically illustrating in detail the structure of a magnetic recording disk according to a first embodiment of the present invention.

FIG. 2 illustrates in detail the structure of the magnetic recording disk 13 according to a first embodiment of the present invention. The magnetic recording disk 13 includes a substrate 23 as a support member, and polycrystalline structures 24 extending over the front and back surfaces of the substrate 23, respectively. The substrate 23 may comprise a disk-shaped Si body 25 and amorphous $SiO_2$ laminations 26 covering over the front and back surfaces of the Si body 25, for example. A glass or aluminum substrate may be employed in place of the substrate 23 of the aforementioned type. Magnetic information data is recorded in the polycrystalline structures 24. The polycrystalline structure 24 is covered with a carbon protection overcoat 27 and a lubricating agent film 28. A carbon material such as diamond-like-carbon (DLC) may be utilized to form the protection overcoat 27.

The polycrystalline structure 24 includes a base layer 31 extending over the surface of the substrate 23. The base layer 31 is made of a crystalline layer including crystals oriented in a predetermined direction. The crystalline layer exhibits a non-magnetic property. MgO may be employed for the base layer 31 so as to establish the crystalline layer, for example. The individual crystals of MgO are oriented along the (100) plane.

A plurality of magnetic crystalline grains 32 exist on the surface of the base layer 31 at spaced locations. The magnetic crystalline grains 32 take the islands structure. The exposed surface of the base layer 31 thus serves to isolate the adjacent magnetic crystalline grains 32 from each other. Specifically, a space is defined between the adjacent magnetic crystalline grains 32. The magnetic crystalline grains 32 are made of an ordered alloy. The ordered alloy may have the $L1_0$ structure. The ordered alloy of the type may ensure the crystalline magnetic anisotropy energy reaching over $1 \times 10^6 J/m^3$, for example. The ordered alloy may be selected from $Fe_{50}Pt_{50}$ (atom %), $Fe_{50}Pd_{50}$ (atom %) and $Co_{50}Pt_{50}$ (atom %), for example. The orientation is established in the (001) plane in the individual magnetic crystalline grains 32. Accordingly, the axis of easy magnetization is aligned in the direction perpendicular to the surface of the substrate 23.

Remarkably fine magnetic crystalline grains 32 can be obtained in the polycrystalline structure 24 as described later in detail. Moreover, since the individual magnetic crystalline grains 32 independently exist, establishment of magnetic interaction can reliably be prevented between the adjacent magnetic crystalline grains 32. Magnetic domains can independently be established in the individual magnetic crystalline grains 32. The fine magnetic crystalline grains 32 magnetically isolated from each other in this manner serves to greatly reduce transition noise between the adjacent recording tracks on the surface of the magnetic recording disk 13. The fine magnetic crystalline grains 32 greatly contribute to improvement in the density of the recording tracks and the recording capacity of the magnetic recording disk 13.

Next, description will be made on a method of making the magnetic recording disk 13. First of all, the disk-shaped substrate 23 is prepared. The substrate 23 is set in a sputtering apparatus. A vacuum condition is established in a chamber of the sputtering apparatus. The substrate 23 is subjected to a heat treatment at 350 degrees Celsius approximately for two minutes, for example. The heat treatment serves to remove gas from the surface of the substrate 23. The substrate 23 is then cooled down to a normal or room temperature.

Figure 3:
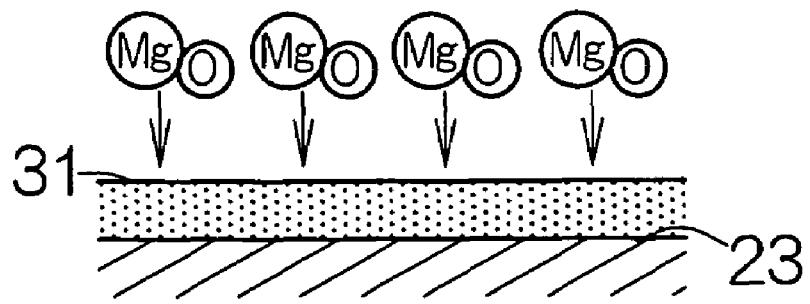
FIG. 3 is an enlarged partial sectional view of a substrate for schematically illustrating a process of forming a base layer on the substrate.

As shown in FIG. 3, MgO is deposited on the surface of the substrate 23 in the sputtering apparatus in the vacuum condition. Specifically, a so-called radio or high frequency sputtering is effected in the sputtering apparatus. The base layer 31 made of MgO is formed on the surface of the substrate 23. The thickness of the base layer 31 is designed to reach 7.5 nm approximately. The room temperature is maintained during the radio frequency (RF) sputtering, so that the orientation is aligned in the (100) plane in the individual non-magnetic crystalline grains of the base layer 31.

Figure 4:
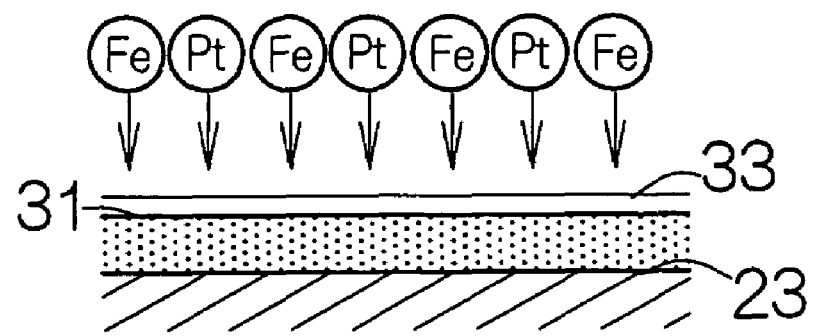
FIG. 4 is an enlarged partial sectional view of the substrate for schematically illustrating a process of forming a $Fe_{50}Pt_{50}$ alloy layer over the substrate.

As shown in FIG. 4, Fe atoms and Pt atoms are thereafter allowed to fall on the surface of the base layer 31 in the sputtering apparatus in the vacuum condition, for example. Here, a direct current (DC) sputtering is utilized to deposit first and second atoms, namely Fe and Pt atoms, in a predetermined ratio. A target of the DC sputtering may include the Fe and Pt atoms in the ratio of 50 atom % to 50 atom %. A $Fe_{50}Pt_{50}$ alloy layer 33 having the thickness of 0. 5 nm approximately is in this manner formed on the surface of the base layer 31.

Figure 5:
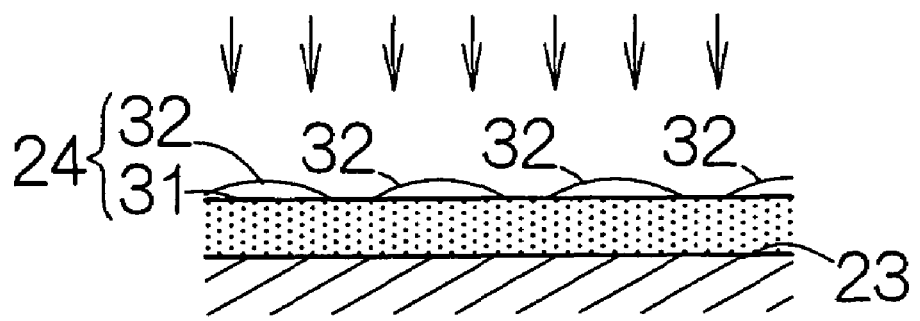
FIG. 5 is an enlarged partial sectional view of the substrate for schematically illustrating a process of forming magnetic crystalline grains based on heat treatment.

The $Fe_{50}Pt_{50}$ alloy layer 33 is then subjected to heat treatment on the substrate 23. The $Fe_{50}Pt_{50}$ alloy layer 33 is exposed to heat of 450 degrees Celsius under a vacuum condition. The heat treatment is maintained for four minutes. Aggregation of $Fe_{50}Pt_{50}$ alloy layer 33 is induced on the base layer 31 based on the heat. As shown in FIG. 5, the magnetic crystalline grains 32, made of an ordered alloy including the Fe and Pt atoms, for example, are formed on the surface of the base layer 31 because of the aggregation. Since the migration of the Fe and Pt atoms is induced to form the magnetic crystalline grains 32, spaces are defined between the adjacent magnetic crystalline grains 32. Moreover, the magnetic crystalline grains 32 are equally arranged or dispersed on the surface of the base layer 31. The MgO serves to establish the orientation in the (001) plane in the individual magnetic crystalline grains 32.

Figure 6:
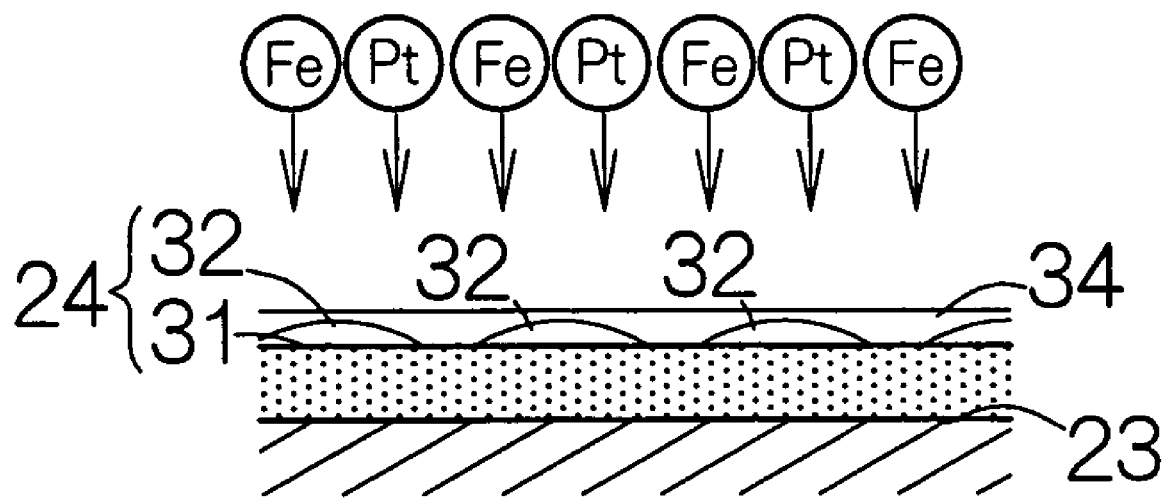
FIG. 6 is an enlarged partial sectional view of the substrate for schematically illustrating a process of forming a $Fe_{50}Pt_{50}$ alloy layer covering over the magnetic crystalline grains on the substrate.

As shown in FIG. 6, the DC sputtering is thereafter again utilized to deposit Fe atoms and Pt atoms on the surface of the base layer 31 in a vacuum condition. The Fe and Pt atoms are deposited in a predetermined ratio in the same manner as described above. A target of the DC sputtering may include the Fe and Pt atoms in the ratio of 50 atom % to 50 atom %. A $Fe_{50}Pt_{50}$ alloy layer 34 having the thickness of 0.5 nm approximately is in this manner formed on the surface of the base layer 31. The $Fe_{50}Pt_{50}$ alloy layer 34 covers over the magnetic crystalline grains 32 on the base layer 31. Here, the substrate 23 may be maintained at the temperature of the heat treatment during the deposition of the Fe and Pt atoms.

Figure 7:
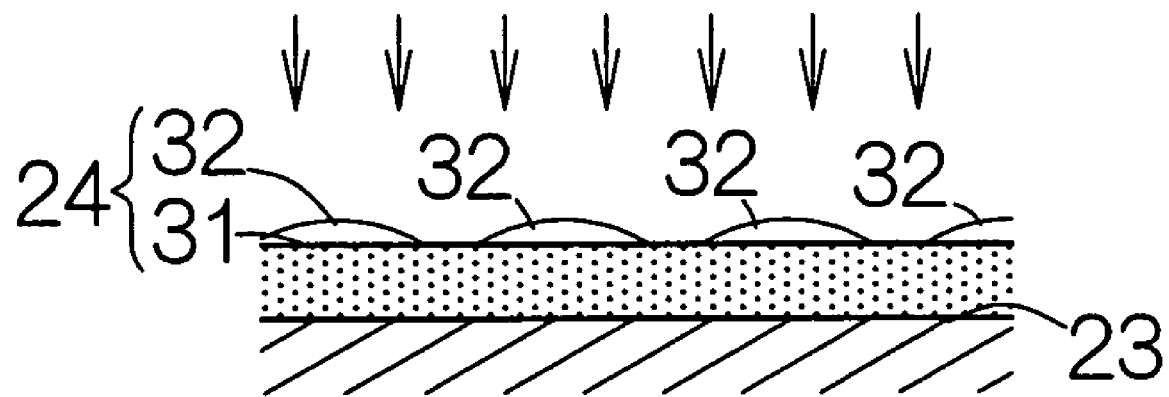
FIG. 7 is an enlarged partial sectional view of the substrate for schematically illustrating a process of growing the magnetic crystalline grains based on heat treatment.

The $Fe_{50}Pt_{50}$ alloy layer 34 is then subjected to heat treatment. Heat of 450 degrees Celsius is applied to the $Fe_{50}Pt_{50}$ alloy layer 34 in a vacuum condition. The heat treatment is maintained for one minute. The applied heat induces aggregation of the $Fe_{50}Pt_{50}$ alloy layer 34 on the base layer 31. The Fe and Pt atoms of the $Fe_{50}Pt_{50}$ alloy layer 34 move toward the existing magnetic crystalline grains 32. The aggregation helps the magnetic crystalline grains 32 of the ordered alloy to grow on the surface of the base layer 31, as shown in FIG. 7. The density and/or size of the magnetic crystalline grains 32 can be controlled based on the thickness of the $Fe_{50}Pt_{50}$ alloy layers 33, 34 as well as the frequency of the deposition and heat treatment.

The inventor has examined the property of the polycrystalline structure 24. The aforementioned magnetic crystalline grains 32 have been formed on the substrate in the same manner as described above in the examination. The inventor prepared a comparative example. Sputtering was effected on a substrate heated to 450 degrees Celsius so as to obtain the comparative example. The $Fe_{50}Pt_{50}$ alloy layer having the thickness of 1.0 nm was formed on the substrate at a time during the sputtering. Aggregation was induced during the deposition so as to form magnetic crystalline grains.

Figure 8:
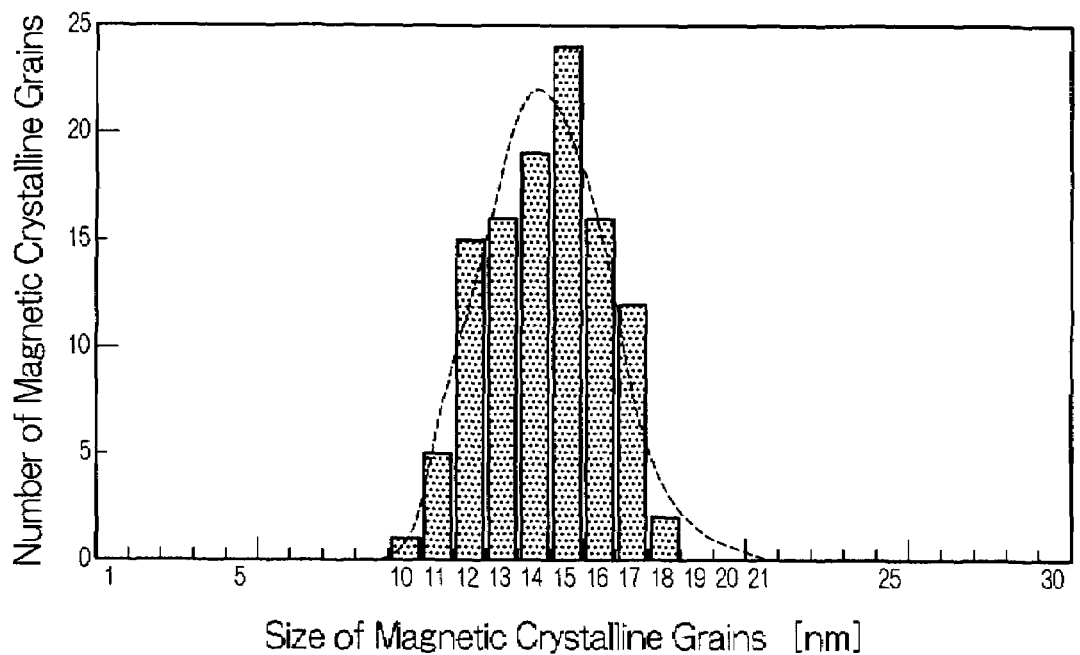
FIG. 8 is a graph illustrating the distribution of grain sizes for the magnetic recording disk according to the first embodiment.
Figure 9:
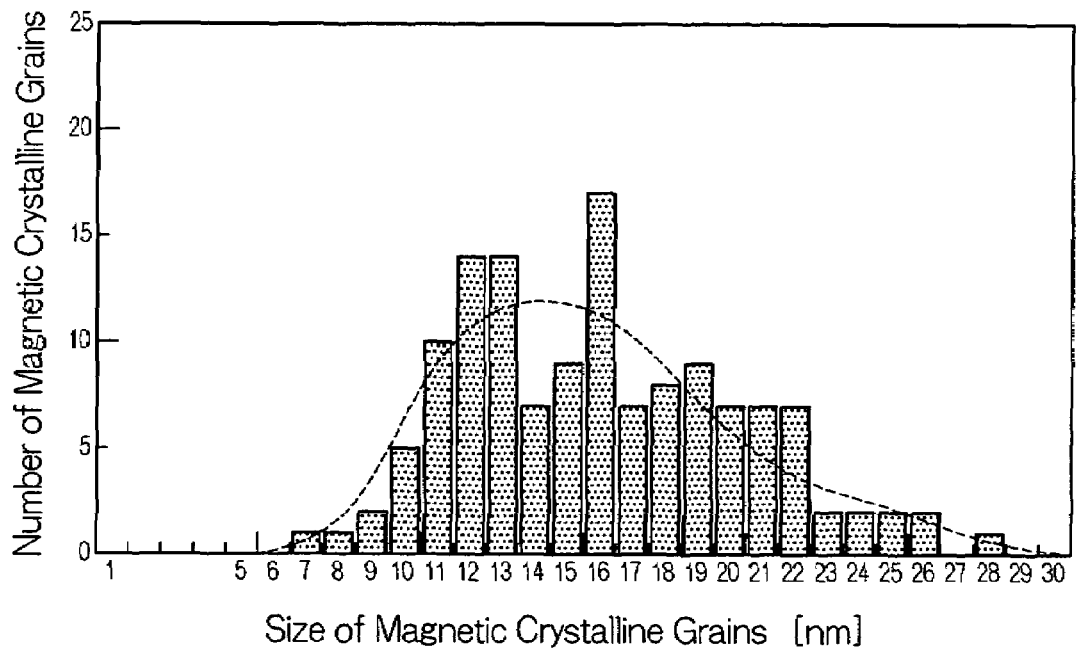
FIG. 9 is a graph illustrating the distribution of grain sizes for a magnetic recording disk according to a comparative example.

Distribution of grain sizes was observed on the surface of the substrates. A high resolution scanning electron microscope was used. The inventor measured the size of the magnetic crystalline grains on the scanning electron micrographs. The inventor also counted the number of magnetic crystalline grains on the scanning electron micrographs. As shown in FIG. 8, the average grain size or diameter of 14.5 nm was obtained for the magnetic crystalline grains 32 according to the embodiment of the present invention. The variance of 2.1 nm was calculated based on the logarithm normal distribution. The ratio of the variance to the average grain size was 0.15. On the other hand, the average grain size of 15.6 nm and the variance of 4.8 nm were obtained for the magnetic crystalline grains according to the comparative example, as shown in FIG. 9. The ratio of the variance to the average grain size was 0.31. A remarkable improvement could be found in the ratio of the variance based on the embodiment of the present invention. It has thus been proven that the magnetic crystalline grains 32 are finely structured. Moreover, the uniformity can be ensured in the size of the magnetic crystalline grains 32.

Figure 10:
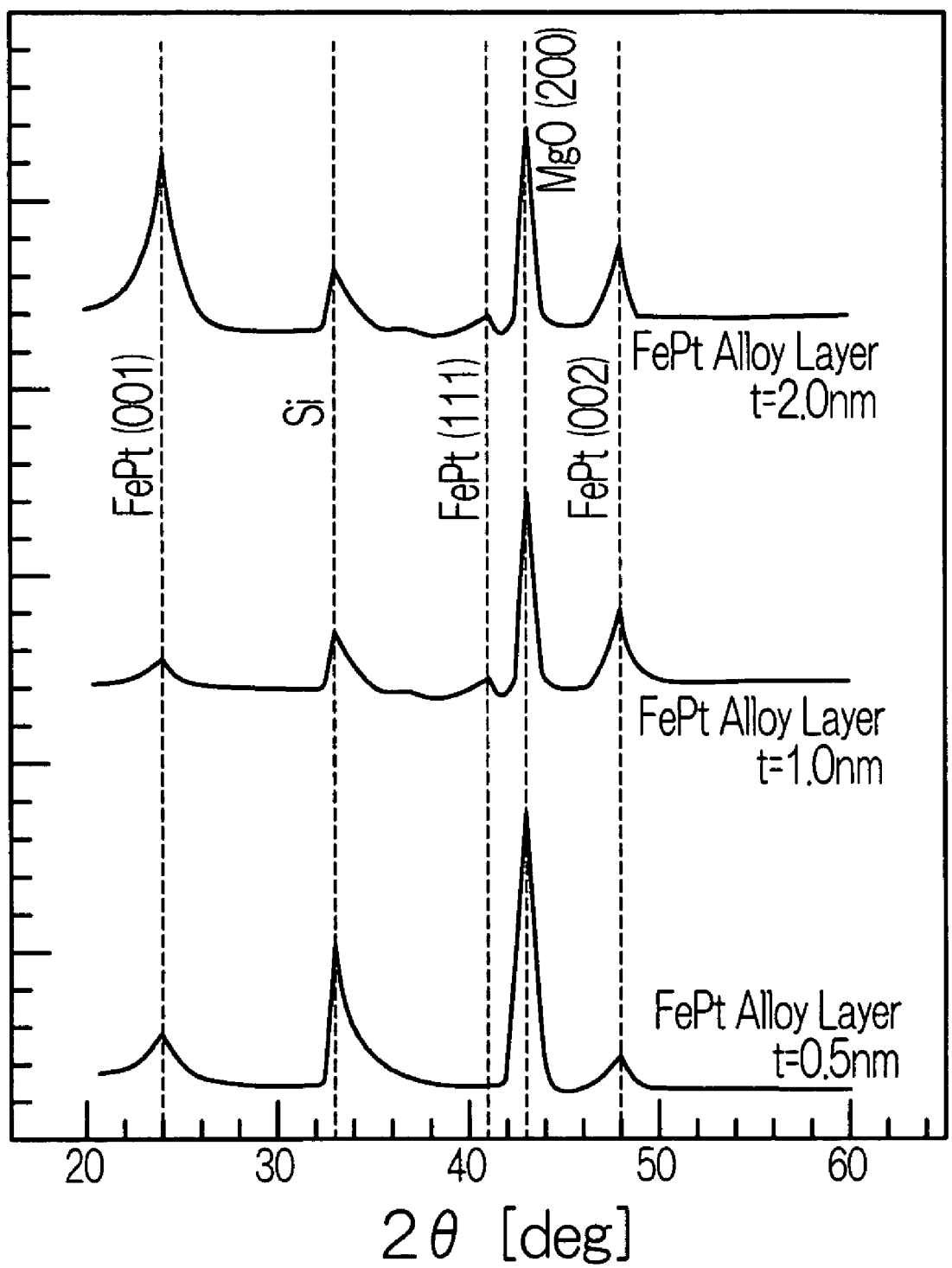
FIG. 10 is a graph illustrating the result of X-ray diffraction.

The inventor has also observed the magnetic crystalline grains 32 based on X-ray diffraction. As shown in FIG. 10, a peak has appeared to represent the (001) plane of the FePt alloy for the magnetic crystalline grains 32. Moreover, no peaks have been observed for the (111) plane of the FePt alloy. Specifically, it has been proven that the magnetic crystalline grains 32 are made of an ordered alloy. On the other hand, if the $Fe_{50}Pt_{50}$ alloy layer is formed to have a larger thickness t prior to heat treatment, a peak tends to appear to represent the (111) plane of the FePt alloy.

Figure 11:
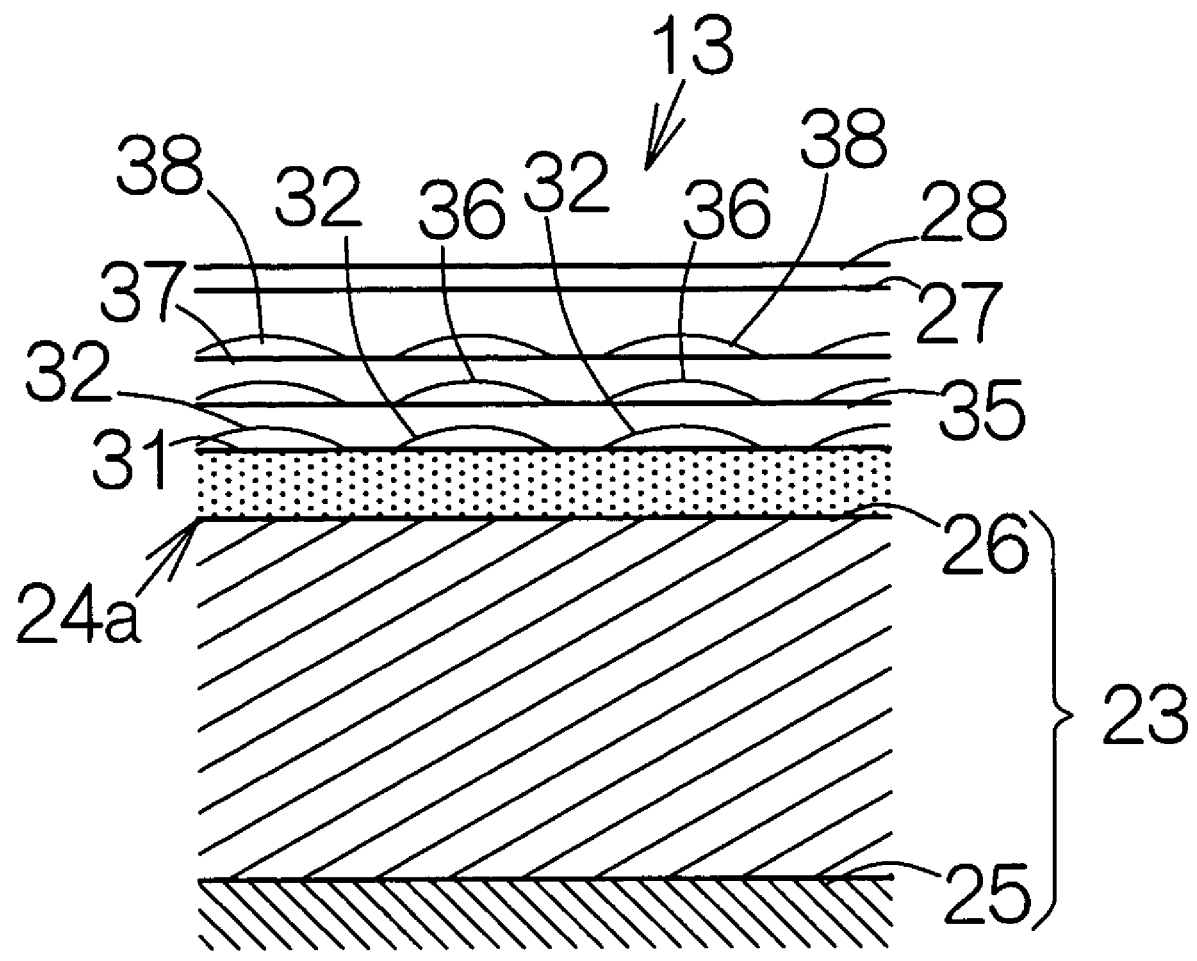
FIG. 11 is an enlarged partial sectional view for schematically illustrating in detail the structure of a magnetic recording disk according to a second embodiment of the present invention.

FIG. 11 illustrates in detail the structure of the magnetic recording disk 13 according to a second embodiment of the present invention. The polycrystalline structure 24a of this embodiment includes a first isolating layer 35 covering over the magnetic crystalline grains 32 on the base layer 31. A plurality of magnetic crystalline grains 36 sparsely exist on the surface of the first isolating layer 35. Specifically, the magnetic crystalline grains 36 take the islands structure. A second isolating layer 37 likewise covers over the magnetic crystalline grains 36 on the surface of the first isolating layer 35. A plurality of magnetic crystalline grains 38 likewise sparsely exist on the surface of the second isolating layer 37. Specifically, the magnetic crystalline grains 38 also take the islands structure. The polycrystalline structure 24a is covered with the carbon protection overcoat 27 and the lubricating agent film 28 in the aforementioned manner. Like reference numerals are attached to structure or components equivalent to those of the aforementioned first embodiment.

The first and second isolating layers 35, 37 are made of a crystalline layer including crystals oriented in a predetermined direction in the same manner as the aforementioned base layer 31. The crystalline layer exhibits a non-magnetic property. MgO may be employed for the first and second isolating layers 35, 37 so as to establish the crystalline layer, for example. The individual crystals of MgO are oriented along the (100) plane.

The exposed surface of the first isolating layer 35 serves to isolate the adjacent magnetic crystalline grains 36 from each other in the aforementioned manner. Specifically, a space is defined between the adjacent magnetic crystalline grains 36. The exposed surface of the second isolating layer 37 likewise serves to isolate the adjacent magnetic crystalline grains 38 from each other. Specifically, a space is defined between the adjacent magnetic crystalline grains 38. The magnetic crystalline grains 36, 38 are made of an ordered alloy. The ordered alloy may have the $L1_0$ structure. The ordered alloy may be selected from $Fe_{50}Pt_{50}$ (atom %), $Fe_{50}Pd_{50}$ (atom %) and $Co_{50}Pt_{50}$ (atom %), for example. The orientation is established in the (001) plane in the individual magnetic crystalline grains 36, 38.

Remarkably fine magnetic crystalline grains 32, 36, 38 can be obtained in the respective layers in the polycrystalline structure 24a. Moreover, since the individual magnetic crystalline grains 32, 36, 38 independently exist, establishment of magnetic interaction can reliably be prevented between the adjacent magnetic crystalline grains 32, 36, 38. Magnetic domains can independently be established in the individual magnetic crystalline grains 32, 36, 38. The fine magnetic crystalline grains 32, 36, 38 magnetically isolated from each other in this manner serves to greatly reduce transition noise between the adjacent recording tracks on the surface of the magnetic recording disk 13. The fine magnetic crystalline grains 32, 36, 38 greatly contribute to improvement in the density of the recording tracks and the recording capacity of the magnetic recording disk 13.

Moreover, the polycrystalline structure 24a allows an increase in the total thickness of the magnetic crystalline grains 32, 36, 38 in the overall polycrystalline structure 24a although the isolating layers 35, 37 are interposed between the magnetic crystalline grains 32, 36, 38. This enables an increased intensity of the magnetic field leaking from the polycrystalline structure 24a. The polycrystalline structure 24a of the type reliably contributes to improvement in the density of the recording tracks and the recording capacity of the magnetic recording disk 13.

Figure 12:
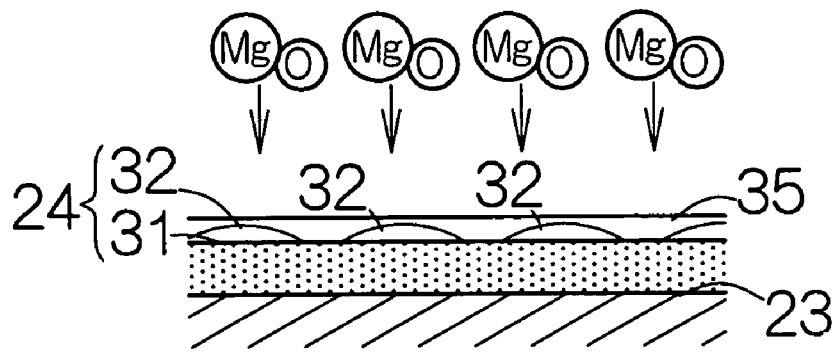
FIG. 12 is an enlarged partial sectional view of the substrate for schematically illustrating a process of forming a first isolating layer covering over the magnetic crystalline grains on the substrate.

When the magnetic recording disk 13 is to be made, the magnetic crystalline grains 32, made of an ordered alloy including Fe and Pt atoms, are formed on the surface of the base layer 31 in the same manner as described above. After the magnetic crystalline grains 32 have been formed, MgO is deposited on the surface of the base layer 31 under a vacuum condition, as shown in FIG. 12. Here, a radio or high frequency sputtering may be utilized to deposit MgO in the aforementioned manner. The first isolating layer 35 made of MgO is formed on the surface of the base layer 31. The thickness of the first isolating layer 35 is designed to reach 2.5 nm approximately. The first isolating layer 35 covers over the magnetic crystalline grains 32 on the surface of the base layer 31. The room temperature is maintained during the radio frequency sputtering, so that the orientation is aligned in the (100) plane in the individual non-magnetic crystalline grains of the first isolating layer 35.

Figure 13:
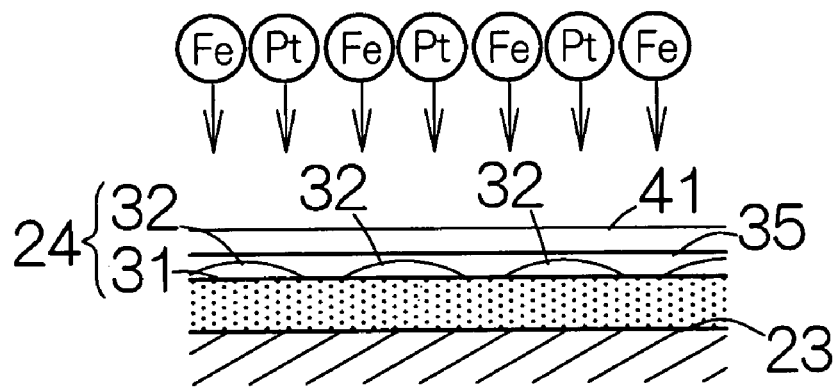
FIG. 13 is an enlarged partial sectional view of the substrate for schematically illustrating a process of forming a $Fe_{50}Pt_{50}$ alloy layer on the surface of the first isolating layer.

As shown in FIG. 13, Fe atoms and Pt atoms are thereafter allowed to fall on the surface of the first isolating layer 35 based on the DC sputtering in a vacuum condition, as shown in FIG. 13. The Fe and Pt atoms are deposited in a predetermined ratio in the same manner as described above. A target of the DC sputtering may include the Fe and Pt atoms in the ratio of 50 atom % to 50 atom %. A $Fe_{50}Pt_{50}$ alloy layer 41 having the thickness of 0.5 nm approximately is in this manner formed on the surface of the first isolating layer 35. Here, the substrate 23 may be maintained at a high temperature of the heat treatment during the deposition of the Fe and Pt atoms.

Figure 14:
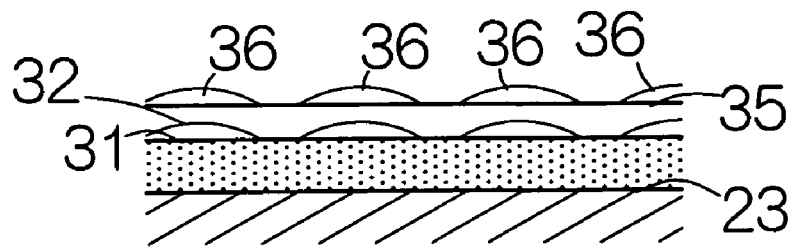
FIG. 14 is an enlarged partial sectional view of the substrate for schematically illustrating a process of forming magnetic crystalline grains on the surface of the first isolating layer based on heat treatment.

The $Fe_{50}Pt_{50}$ alloy layer 41 is then subjected to heat treatment on the substrate 23. The $Fe_{50}Pt_{50}$ alloy layer 41 is exposed to heat of 450 degrees Celsius under a vacuum condition. The heat treatment is maintained for one minute. Aggregation of $Fe_{50}Pt_{50}$ alloy layer 41 is induced on the first isolating layer 35 based on the heat. As shown in FIG. 14, the magnetic crystalline grains 36, made of an ordered alloy including the Fe and Pt atoms, for example, are formed on the surface of the first isolating layer 35 because of the aggregation. In this case, the aggregation can be realized without receiving influence from the existing magnetic crystalline grains 32. Enlargement of the magnetic crystalline grains 32 can accordingly be prevented. The magnetic crystalline grains 36 are anew formed on the first isolating layer 35. Spaces are reliably defined between the adjacent magnetic crystalline grains 36 in the same manner as the magnetic crystalline grains 32. Moreover, the magnetic crystalline grains 36 are equally arranged or dispersed on the surface of the first isolating layer 35. The MgO serves to establish the orientation in the (001) plane in the individual magnetic crystalline grains 36.

MgO is again deposited on the surface of the first isolating layer 35 under a vacuum condition after the formation of the magnetic crystalline grains 36. The second isolating layer 37 made of MgO is then formed on the surface of the first isolating layer 35. The thickness of the second isolating layer 37 is designed to reach 2.5 nm approximately. The second isolating layer 37 covers over the magnetic crystalline grains 36 on the surface of the first isolating layer 35. Fe atoms and Pt atoms are thereafter allowed to fall on the surface of the second isolating layer 37 based on the DC sputtering in a vacuum condition in the same manner as described above. A $Fe_{50}Pt_{50}$ alloy layer having the thickness of 0.5 nm approximately is again formed on the surface of the second isolating layer 37. Aggregation of the $Fe_{50}Pt_{50}$ alloy layer is then induced on the second isolating layer 37. The magnetic crystalline grains 38, made of an ordered alloy including the Fe and Pt atoms, are formed on the surface of the second isolating layer 37 based on the aggregation. The polycrystalline structure 24a is in this manner formed.

The inventor has examined the property of the polycrystalline structure 24a. The inventor prepared two examples in the examination. The $Fe_{50}Pt_{50}$ alloy layer 34 having the thickness of 0.40 nm was formed on the surface of the base layer 31 in establishing the magnetic crystalline grains 32 in the first example. The isolating layer 35 of MgO having the thickness of 2.5 nm was formed after the magnetic crystalline grains 32 had been formed based on heat treatment in the aforementioned manner. The magnetic crystalline grains 36 were formed on the surface of the isolating layer 35. The $Fe_{50}Pt_{50}$ alloy layer 41 was formed on the surface of the isolating layer 35 in establishing the magnetic crystalline grains 36. No isolating layer 37 and no magnetic crystalline grains 38 were formed over the isolating layer 35. The $Fe_{50}Pt_{50}$ alloy layer 34 having the thickness of 0.40 nm was likewise formed in establishing the magnetic crystalline grains 32 in the second example. The $Fe_{50}Pt_{50}$ alloy layer 41 having the thickness of 0.25 nm was also formed on the surface of the isolating layer 35 in establishing the magnetic crystalline grains 36 in the second example. The second example also omitted formation of the isolating layer 37 and the magnetic crystalline grains 38 over the isolating layer 35.

Figure 15:
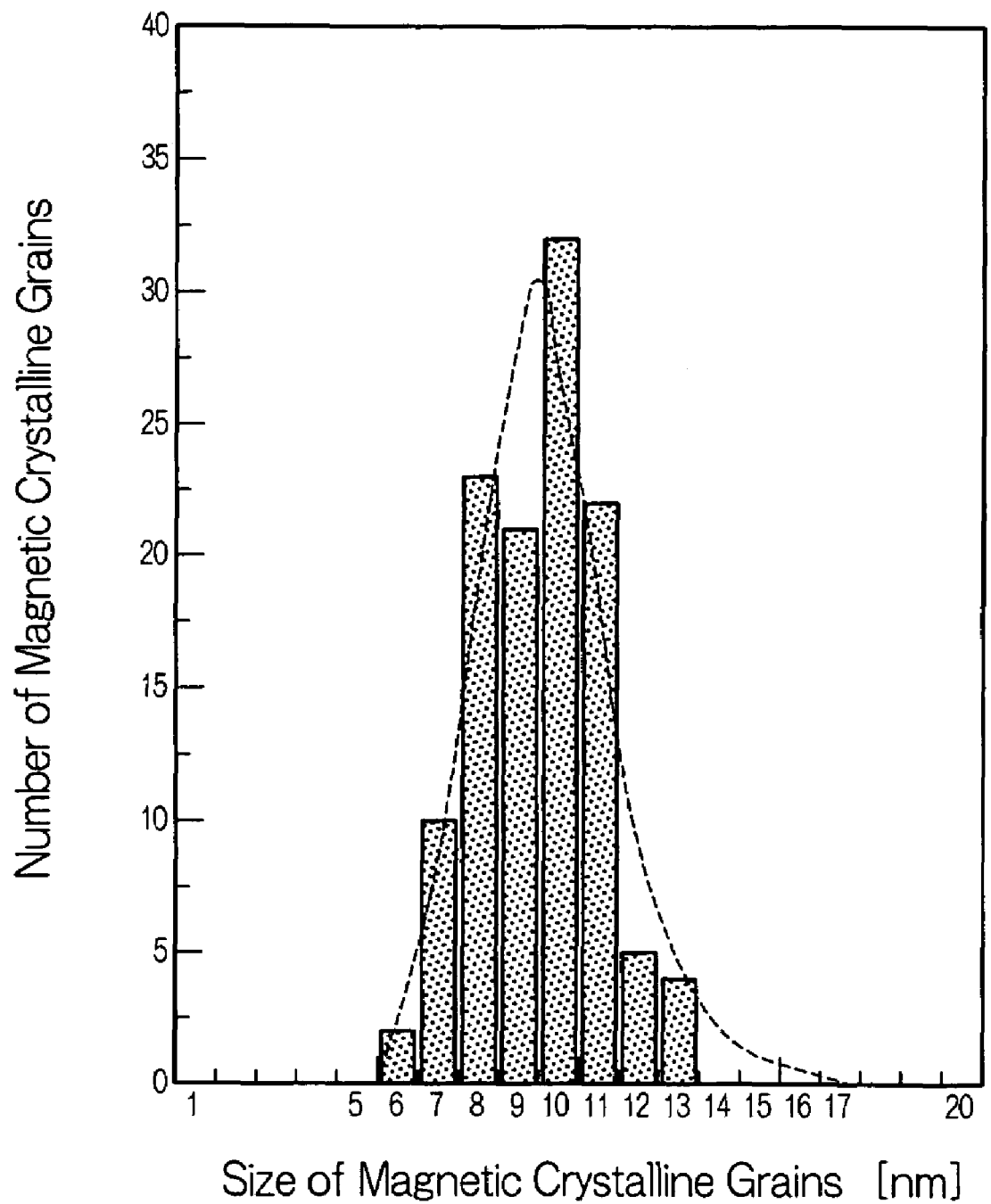
FIG. 15 is a graph illustrating the distribution of grain sizes for the magnetic crystalline grains according to a first example in the magnetic recording disk of the second embodiment.
Figure 16:
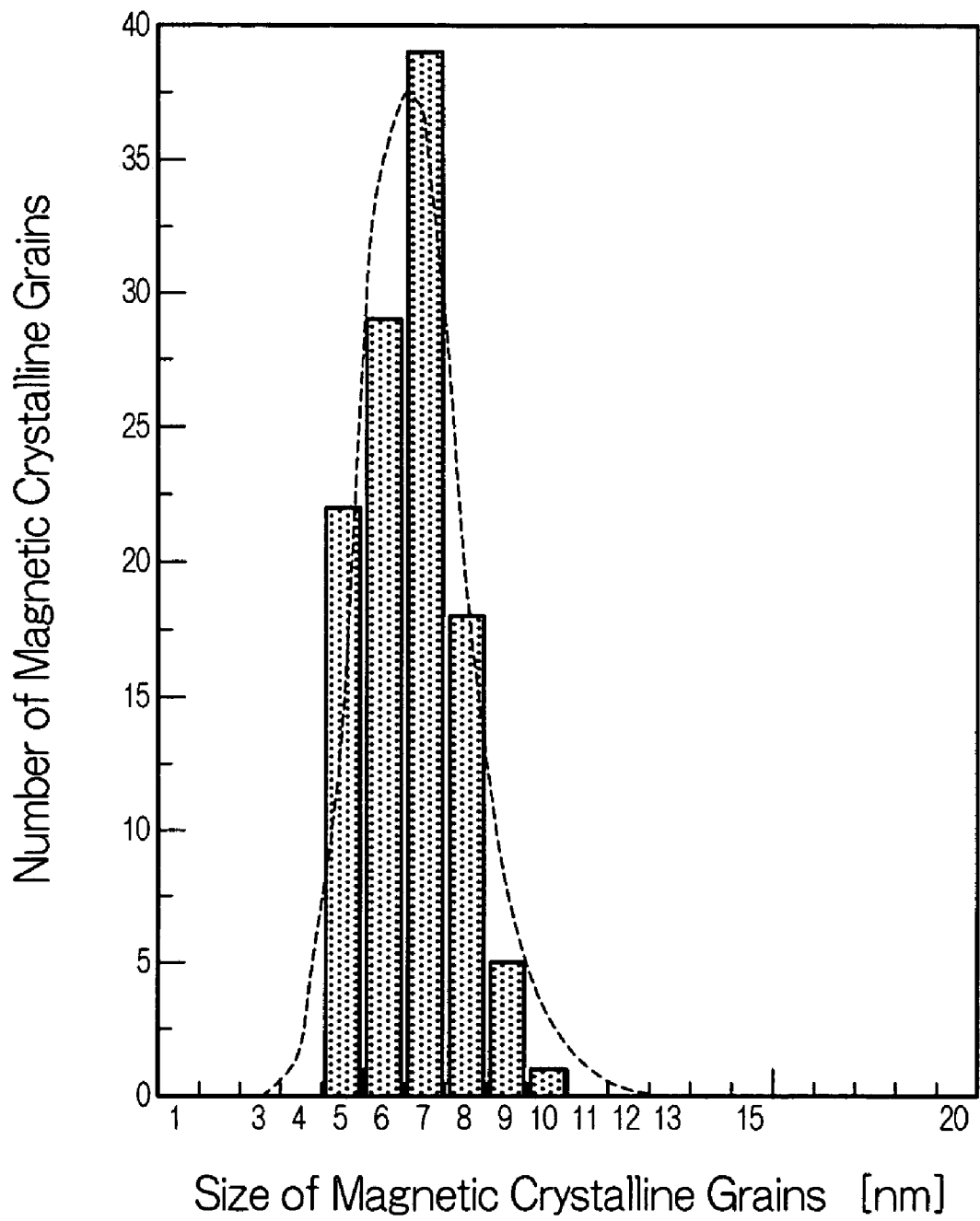
FIG. 16 is a graph illustrating the distribution of grain sizes for the magnetic crystalline grains according to a second example in the magnetic recording disk of the second embodiment.

Distribution of grain sizes of the magnetic crystalline grains 36 was observed on the surface of the substrates. A high resolution scanning electron microscope was used. The inventor measured the size of the magnetic crystalline grains 36 on the scanning electron micrographs. The inventor also counted the number of magnetic crystalline grains 36 on the scanning electron micrographs. As shown in FIG. 15, the average grain size or diameter of 9.6 nm was obtained for the magnetic crystalline grains 36 in the first example. The variance of 1.7 nm was calculated based on the logarithm normal distribution. The ratio of the variance to the average grain size was 0.18. The coercive force of 160 kA/m approximately was obtained in the direction perpendicular to the surface of the substrate 23. As shown in FIG. 16, the average grain size of 6.6 nm and the variance of 1.3 nm were obtained for the magnetic crystalline grains 36 in the second example. The ratio of the variance to the average grain size was 0.20. The coercive force of 215 kA/m approximately was obtained in the direction perpendicular to the surface of the substrate 23 according to the second example. In either case, a remarkable improvement could be found in the ratio of the variance. It has thus been proven that a sufficient coercive force could be obtained based on the magnetic crystalline grains 36 finely structured.

The axis of easy magnetization may be aligned in parallel with the surface of the substrate 23 in the magnetic crystalline grains 32, 36, 38 of the polycrystalline structure 24, 24a. In this case, the orientation of the (100) plane should be established in the $Fe_{50}Pt_{50}$ magnetic crystalline grains 32, 36, 38 so as to set the axis of easy magnetization within a plane. This orientation can be controlled based on the orientation of the MgO. In addition, as long as chemical reactions are sufficiently prevented in the Si body 25, for example, the $SiO_2$ lamination 26 needs not be formed on the surface of the substrate 23. Furthermore, even if an ordered alloy such as $Fe_{50}Pd_{50}$ (atom %), $Co_{50}Pt_{50}$ (atom %), or the like, is employed to form the magnetic crystalline grains 32, 36, 38, in place of $Fe_{50}Pt_{50}$ (atom %), the aforementioned method can be utilized to form the polycrystalline structure 24, 24a.

What is claimed is:

1. A polycrystalline structure comprising:
    a base layer; and
    magnetic crystalline grains spaced from each other on the base layer so as to form island structures on a surface of the base layer, said magnetic crystalline grains being made of an ordered alloy,
    wherein at least some of the magnetic crystalline grains have a bottom surface contacting the surface of the base layer.

2. A magnetic recording medium comprising:
    a support body;
    a base layer extending over a surface of the support body;
    magnetic crystalline grains spaced from each other on the base layer so as to form island structures on a surface of the base layer, said magnetic crystalline grains being made of an ordered alloy, and
    wherein at least some of the magnetic crystalline grains have a bottom surface contacting the surface of the base layer.

3. The polycrystalline structure according to claim 1, wherein said ordered alloy has $L1_0$ structure.

4. The polycrystalline structure according to claim 1, wherein said base layer is made of non-magnetic crystals having a predetermined orientation.

5. The polycrystalline structure according to claim 1, further comprising:
    an isolating layer covering over the magnetic crystalline grains on the base layer; and
    upper magnetic crystalline grains spaced from each other on a surface of the isolating layer, said upper magnetic crystalline grains being made of an ordered alloy.

6. The polycrystalline structure according to claim 5, wherein said isolating layer is made of non-magnetic crystals having a predetermined orientation.

7. The polycrystalline structure according to claim 1, further comprising:
    a first isolating layer covering over the magnetic crystalline grains on the base layer;
    first upper magnetic crystalline grains spaced from each other on a surface of the first isolating layer, said first upper magnetic crystalline grains being made of an ordered alloy;
    a second isolating layer covering over the first upper magnetic crystalline grains on the first isolating layer; and
    second upper magnetic crystalline grains spaced from each other on a surface of the second isolating layer, said second upper magnetic crystalline grains being made of an ordered alloy.

8. The polycrystalline structure according to claim 7, wherein said first and second isolating layers are made of non-magnetic crystals having a predetermined orientation.

9. The magnetic recording medium according claim 2, wherein said ordered alloy has $L1_0$ structure.

10. The magnetic recording medium according to claim 2, wherein said base layer is made of non-magnetic crystals having a predetermined orientation.

11. The magnetic recording medium according claim 2, further comprising:
    an isolating layer covering over the magnetic crystalline grains on the base layer; and
    upper magnetic crystalline grains spaced from each other on a surface of the isolating layer, said upper magnetic crystalline grains being made of an ordered alloy.

12. The magnetic recording medium according to claim 11, wherein said isolating layer is made of non-magnetic crystals having a predetermined orientation.

13. The polycrystalline structure according to claim 1, wherein each of the magnetic crystalline grains has a bottom surface contacting the surface of the base layer.

14. The magnetic recording medium according to claim 2, wherein each of the magnetic crystalline grains has a bottom surface contacting the surface of the base layer.

* * * * *